INVENTOR.
WILLIAM L. ORTLIEB

BY Ronald S Cornell

ATTORNEY

United States Patent Office 3,522,432
Patented Aug. 4, 1970

3,522,432
SCANNING APPARATUS FOR REGISTRATION
MARKS USING ULTRA-VIOLET LIGHT
William L. Ortlieb, Hoboken, N.J., assignor to Colgate-Palmolive Company, New York, N.Y., a corporation of Delaware
Filed Nov. 24, 1967, Ser. No. 685,458
Int. Cl. G01n 21/38
U.S. Cl. 250—71          1 Claim

ABSTRACT OF THE DISCLOSURE

An alignment apparatus for containers such as a plastic tube having a registration mark thereon invisible to the naked eye and capable of re-radiating light preferably in a portion of the visible spectrum. Tube holder means are provided for mounting the tube, and suitable drive means are provided for rotating the tube. An ultra-violet light source is provided as is scanning means for signalling the presence of re-radiated light from the registration mark and for controlling the drive means.

---

The present invention relates generally to article handling and treating and more particularly to an apparatus for accomplishing registration of containers such as plastic tubes and the like after the printing or application of indicia thereon.

In the past manufacturers and fillers of tubes and other containers have employed various methods for aligning them after labels, logos or the like have been printed thereon. Exact alignment is mandatory in order that the containers can be sealed with a great degree of accuracy and uniformity allowing for proper location of the logo as is necessary for a branded, well-known commodity.

With the development and increasing popularity of the plastic tube which is under expected conditions unbreakable and resistant to rupture, new problems have arisen in that previously known alignment methods and apparatus fail to provide an acceptable solution to the problem because the crimped base used in metallic tubes is eliminated and the visible registration marks previously employed are unsightly and therefore undesirable.

In carrying out the present invention, plastic tubes or the like are provided with registration marks which are invisible to the naked eye under normal lighting and which therefore do not leave any unsightly registry marks on the finished consumer product and whereby optimum alignment of the tubes during filling and closing operations can be attained.

The apparatus that is utilized in connection with the invention includes a fluorescent tube type ultra-violet light source operated on filtered direct current and arranged to bathe the tube provided with the registration mark with diffused light of non-varying or slowly varying intensity. A scanner, using a photo-conductive cell or photo-voltaic cell sensitive in the re-radiated wave length region aimed at the bathed area is provided for receiving light signals from passage of the registration mark as the tube is rotated. The registration mark has the property of re-radiating incident ultra-violet light at a wave length in the visible portion of the spectrum where it can be sensed by the scanner. The light signal from the photocell of the scanner is used to control the movement of the tube and hence of the scanned surface via a self-contained amplifier and associated electro-mechanical devices.

It is an object of the present invention to provide a filtered direct current ultra-violet light source which will operate in conjunction with coordinated scanning means so that exact alignment can be accomplished eliminating the need for unsightly registration marks on a plastic tube.

It is another object of the present invention to provide means for alignment of containers such as plastic tubes containing invisible markings which are capable of being sensed by suitable scanning means under ultra-violet light and which registration marks are readable by automatic scanning equipment to provide for exact alignment of the container in a filling and closing machine or in a labeling or printing machine or the like.

It is another object of the present invention to provide an ultra-violet light scanning apparatus which serves to sense registration markings which are invisible under normal lighting conditions on containers for the purpose of providing exact alignment of the containers prior to filling, closing or labeling said containers.

An additional object of this invention is to provide automatic scanning and alignment equipment which will be more consistent and more accurate than possible through human positioning and which will provide for automatic alignment of containers preventing incorrect or improper positioning.

Still another object of the invention is to allow for relatively large registration marks on the containers without rendering them unsightly. It has been found that any reduction in the size of a visible registration mark to improve the appearance of the finished consumer product results in a lower signal to noise ratio than is feasible to utilize since such would result in more scrap loss due to a larger percentage of mis-registered containers. Further, the use of a smaller visible mark demands more accurate container handling facilities since a smaller mark may in some instances not be sensed at all.

A yet further object of this invention is to provide a machine for automatic alignment of containers such as tubes which can be used in a continuously moving automated operation so as to speed up automatic filling, closing, and labeling of plastic tubes or like containers without placing unsightly registration marks thereupon.

These, together with the other objects, features and advantages of the present invention, will become more apparent when consideration is given in conjunction with the accompanying drawings and specifications, wherein.

Figure 1:
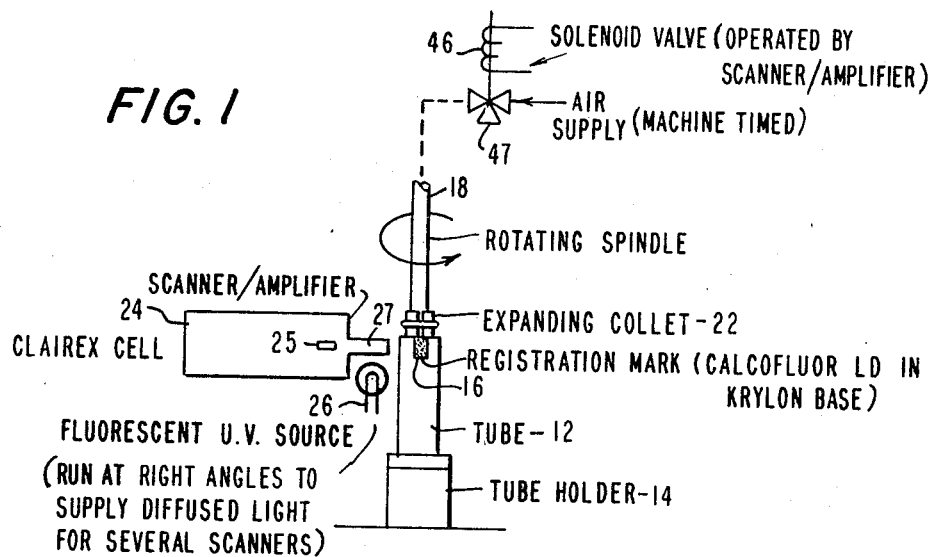
FIG. 1 is a diagrammatic illustration of an embodiment of the scanning and registry device according to the present invention.

Referring now specifically to the drawing, and more particularly to FIG. 1 thereof, there is seen a mechanical arrangement according to the present invention. In particular a tube 12 of a deformable resilient clear or opague plastic or the like is held at its base in a clamp-like holder 14.

This tube holder 14 is of the type which is itself stationary and frictionally grasps the tube 12 with a predetermined light pressure to stop rotation of the tube therein after release of the tube rotating means to be hereinafter defined.

A registration mark 16 which is invisible under normal white light but having the property of re-radiating incident ultra-violet light of a peak power wave length of approximately 3560 angstroms at a wave length in the blue portion of the visible spectrum is applied in the form of an ink, paint or lacquer on the tube 12. It has been found that a solution of Calcofluor LD in a Krylon base is suitable.

A rotatable spindle 18 equipped with an expanding collet 22 is adapted to be placed into the neck of the tube 12 to facilitate rotation of the tube 12 through rotation of the spindle 18 by suitable drive means.

A scanner/amplifier assembly 24, including a non-focused scanner using a fast, blue sensitive photo-conductive cell 25, such as a Clairex 905HL cell, is positioned adjacent the upper part of the tube 12. The scanner/amplifier assembly 24 includes a light directing tube 27 aimed at the area to be scanned to receive light signals from passage of the registration mark 16 across the scanned area.

A fluorescent tube type ultra-violet light source 26 operating on filtered direct current supplied at 150 volts is placed at right angles to the tube 12 and spindle 18 and is adapted to bathe the scanned area with diffused ultra-violet light of non-varying intensity for one or a plurality of assemblies 24 placed in close proximity to the light source 26.

After a tube has been placed into the tube holder 14 and the rotating spindle 18 has been placed in the neck thereof the tube 12 is rotated by expanding the collet 22 which grips the inside of the tube 12 until the registration mark 16 is positioned directly in front of the scanner/amplifier assembly 24 and the rotation of the tube is stopped by the signal from the photo-cell 25 caused by the photo-cell being actuated by re-radiated light from the registration mark 16 at a wave length in the blue portion of the visible spectrum and in the desirable response curve of the photo-cell 25.

Figure 2:
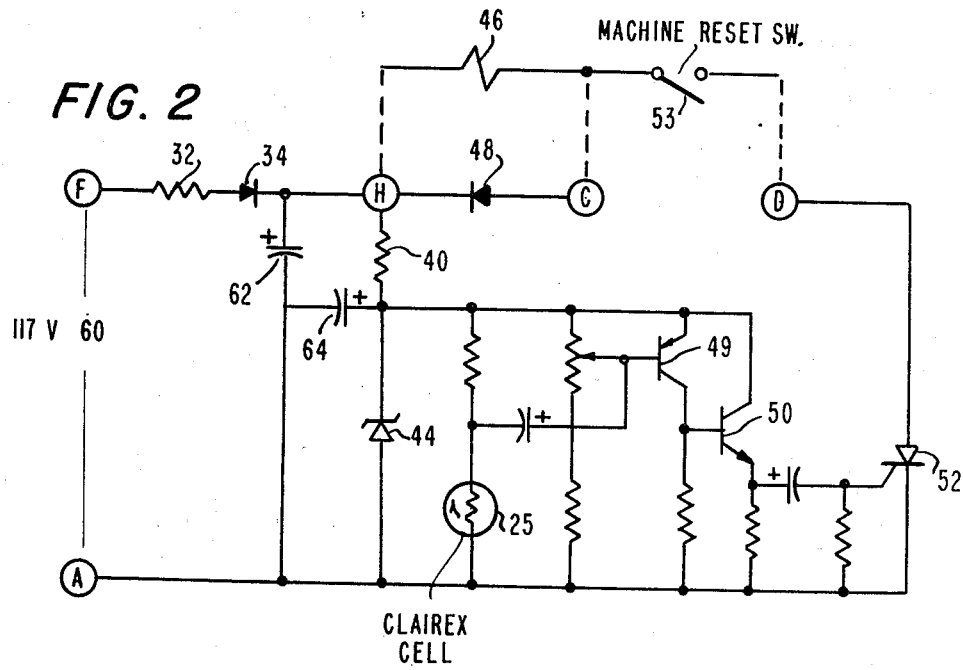
FIG. 2 is a schematic wiring diagram illustrating circuitry employed in the present invention.

Referring now specifically to FIG. 2, there is seen a latching amplifier of solid state circuitry wherein the assembly 24 is connected across a power source at amphenol 165 type connector terminals A and F. The resistor 32 of 47 ohms, a 400 peak inverse voltage ¾ ampere diode rectifier 34 and capacitor 62 of 8 microfarads at 250 volts convert the A.C. line voltage into a filtered 150 volt D.C. source for supplying both the power circuitry and the signal circuitry.

The Clairex cell 25 forming a part of a voltage divider provides a change in voltage to the amplifier circuit when exposed to the re-radiated light from the registration mark 16 bathed by the source 26.

There is also connected to the circuit extending from connector terminal H a solenoid coil 46 which is designed to activate an armature of the solenoid connected to the ten watt solenoid valve 47 for controlling and stopping the rotation of tube 12 by expelling the air from the expanding collet 22. Resistor 40 of 20,000 ohms, 1 watt, capacitor 64 of 50 microfarads at 25 volts, diode 44 ($Z4 \times L22$) rated at 22 volts at 1 watt comprises a power source for the signal amplifier.

The voltage change from the photocell divider circuit will be amplified through transistors 49, 50 and used to fire the silicon control rectifier 52 which applies power to the solenoid valve 47.

A second 400 peak inverse voltage diode 48 is provided to prevent damage from activation of the coil 46 and also to reduce noise in the circuit and thereby prevent premature activation of value 47 and is connected between terminals H and C.

The reset switch 53 at connector terminals C and D is for the purpose of de-energizing the silicon control rectifier 52 and solenoid valve 47 at the end of a cycle.

The type of amplifier above described serves to provide the scanning capability for the circuit and to latch the circuit when the registration mark 16 on the tube 12 comes in front of the scanner/amplifier 24 actuating solenoid valve 47 thereby stopping rotation of the tube 12 and holding the tube 12 in alignment for the filling and closing thereupon.

Other circuitry of either solid state construction or tube amplification with latching features could be employed in accordance with the concepts of this invention.

Figure 3:
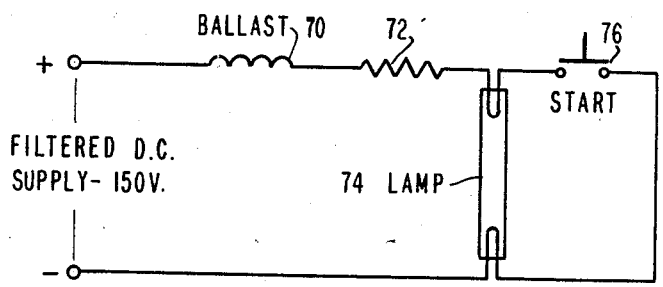
FIG. 3 is a schematic wiring diagram of the ultraviolet light source employed in the invention.

Referring now in particular to FIG. 3 there is seen a schematic view of the ultra-violet light source 26 including a ballast 70 of the type of G.E. 58G690 which is connected in series to a resistor 72 of the value of 700 ohms/ 100 watts which in turn is connected in series to one leg of a fluorescent ultra-violet lamp 74 of the type F6t5BLB and to a starting switch 76 for closing the lamp starting circuit.

From the foregoing description it will be apparent that there is provided means for detecting normally invisible registration marks on plastic tubes or the like utilizing a scanner/amplifier assembly and a fluorescent ultra-violet light to provide for positive registry of tubes after printing and/or labeling and prior to filling and closing. The above described device provides for accuracy and sensitivity in response to direct current ultra-violet light which was heretofore unknown when compared to visible light signals and provides a means for attaining uniformity in a degree never before available with respect to alignment of plastic tubes and the like without the necessity of using unsightly registration marks.

Although there is shown and described a preferred embodiment of the present invention, it is to be understood that various changes and modifications may be made in the circuitry without departing from the spirit and scope of the present invention.

I claim:
1. An apparatus comprising a tube having a registration mark thereon invisible to the naked eye and capable of reflecting light in a photo-electrically discernible visible portion of the light spectrum, means for supporting a tube, actuating means for controlling an operation on said tube, drive means including a rotating spindle, means connecting said spindle and a tube for rotating said tube in accordance with rotation of said spindle, means including an ultra-violet source operating on a filtered direct current for bathing at least the portion of a tube having a mark thereon with non-cyclic ultra-violet light radiation so that the registration mark re-radiates light in said photo-electrically discernible visible portion of the light spectrum, scanning means for signalling the presence of re-radiated light from the registration mark, said scanning means including a photo-cell sensitive to the re-radiated light in the blue portion of the visible spectrum, and amplifier means connected to said scanning means for amplifying the signal from said scanning means, said amplifier means being connected to said actuating means for control thereof, said actuating means including a solenoid valve having a solenoid coil connected to said amplifier means, said drive means including an air supply, said solenoid valve being connected to said air supply and controlling said air supply.

References Cited
UNITED STATES PATENTS

| | | | |
|---|---|---|---|
| 2,929,931 | 3/1960 | Richter et al. | 250—71 |
| 3,105,908 | 10/1963 | Burkhardt et al. | |
| 3,307,696 | 3/1967 | Sager. | |
| 3,348,049 | 10/1967 | Stacey. | |
| 2,485,888 | 10/1949 | Jordan. | |
| 3,037,156 | 5/1962 | Koulikovitch | 318—22 |
| 3,335,281 | 8/1967 | Willits. | |

ARCHIE R. BORCHELT, Primary Examiner

U.S. Cl. X.R.

250—83.3, 219